United States Patent
Lauper

(10) Patent No.: US 7,801,514 B2
(45) Date of Patent: Sep. 21, 2010

(54) ORDER METHOD FOR MOBILE RADIO NETWORK USERS

(75) Inventor: Eric Lauper, Bern (CH)

(73) Assignee: Swisscom AG, Bern (CH)

( * ) Notice: Subject to any disclaimer, the term of this patent is extended or adjusted under 35 U.S.C. 154(b) by 1056 days.

(21) Appl. No.: 11/513,973

(22) Filed: Aug. 31, 2006

(65) Prior Publication Data

US 2006/0293085 A1    Dec. 28, 2006

Related U.S. Application Data

(63) Continuation of application No. PCT/EP2005/050932, filed on Mar. 2, 2005.

(30) Foreign Application Priority Data

Mar. 3, 2004    (EP)    .................................. 04100864

(51) Int. Cl.
H04W 88/02    (2009.01)
(52) U.S. Cl. .................................................... 455/417
(58) Field of Classification Search ................ 455/417; 726/7; 713/176, 182, 185
See application file for complete search history.

(56) References Cited

U.S. PATENT DOCUMENTS

| | | | |
|---|---|---|---|
| 7,267,275 B2 * | 9/2007 | Cox et al. .................... | 235/451 |
| 7,580,678 B2 * | 8/2009 | Byman-Kivivuori et al. ...... | 455/41.2 |
| 2002/0170952 A1 | 11/2002 | Alsafadi et al. | |
| 2002/0174336 A1 | 11/2002 | Sakakibara et al. | |
| 2003/0120745 A1 | 6/2003 | Katagishi et al. | |
| 2004/0002305 A1 * | 1/2004 | Byman-Kivivuori et al. ...... | 455/41.2 |
| 2004/0203944 A1 * | 10/2004 | Huomo et al. .............. | 455/466 |
| 2005/0092825 A1 * | 5/2005 | Cox et al. .................... | 235/375 |
| 2006/0094411 A1 * | 5/2006 | Dupont ....................... | 455/417 |

FOREIGN PATENT DOCUMENTS

| | | |
|---|---|---|
| EP | 1 054 335 A2 | 11/2000 |
| EP | 1 244 043 A2 | 9/2002 |
| EP | 1 376 457 A1 | 1/2004 |
| JP | 2001283016 | 10/2001 |
| JP | 2002077994 | 3/2002 |

(Continued)

OTHER PUBLICATIONS

Sanjay Sarma, David Brock, & Daniel Engels, "Radio Frequency Identification and the Electronic Product Code", (Nov. 2001), IEEE Micro, (MIT Auto-ID Center), IEEE Computer Society Press, Los Alamitos, CA, vol. 21, Issue 6, pp. 50-54.*

(Continued)

Primary Examiner—Diane Mizrahi
(74) Attorney, Agent, or Firm—Pearne & Gordon LLP

(57) ABSTRACT

Method for making services available to mobile users with the following method steps: the mobile subscriber reads an electronic code (100) stored in an RFID element (10) with an RFID reader device (2); said electronic code (100) is transmitted over a telecommunication network to a server (5); the server (5) transmits a query to a name service-server (6), wherein links between several electronic codes (100) and several electronic addresses are registered; the name service-server (6) sends the address of the page said above-mentioned page; the ordered service is supplied to the mobile user.

18 Claims, 3 Drawing Sheets

FOREIGN PATENT DOCUMENTS

| | | |
|---|---|---|
| JP | 2002169783 | 6/2002 |
| JP | 2003162474 | 6/2003 |
| WO | 02082363 A1 | 10/2002 |
| WO | WO 03/019926 A1 | 3/2003 |
| WO | 03075584 A2 | 9/2003 |
| WO | WO 03/091924 A1 | 11/2003 |
| WO | WO 03/107146 A2 | 12/2003 |
| WO | 2004003801 A1 | 1/2004 |

OTHER PUBLICATIONS

Brock, David L. "XP002422185-White Paper: The Electronic Product Code (EPC) as a Meta Code"; Internet Citation, AU-Brock D L., ORD Sep. 1, 2003; URL http://www.autoid.mit.edu/whitepapers/MIT-AUTOID-WH020.pdf.

* cited by examiner

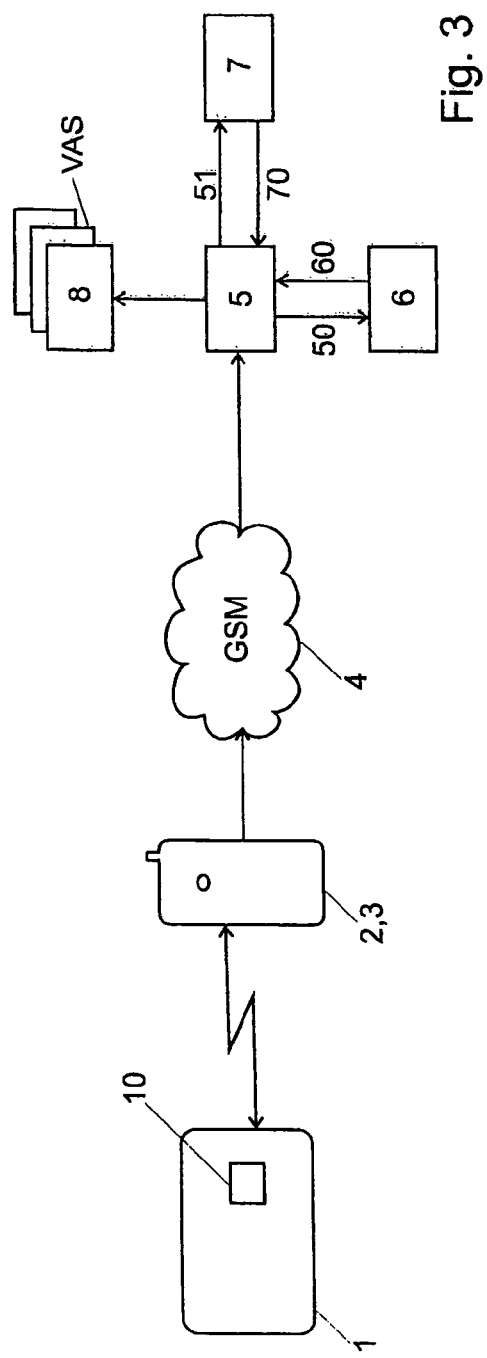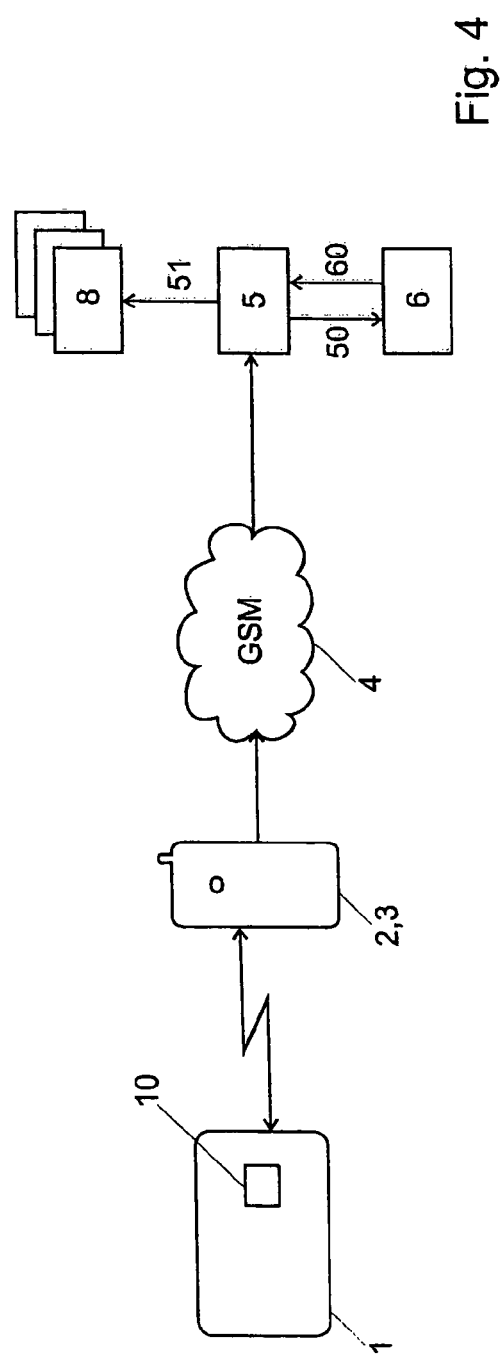

US 7,801,514 B2

ORDER METHOD FOR MOBILE RADIO NETWORK USERS

REFERENCE DATA

This application is a continuation of International Patent Application of 2005WO-EP050932 (WO2005086467) filed on Mar. 2, 2005 claiming Convention priority of European application 2004EP-100864 (EP1571590) filed Mar. 3, 2004, the contents whereof are hereby incorporated by reference.

TECHNICAL FIELD

The present invention concerns a method with which services can be made available to a mobile user, for example a method with which a network operator of a mobile radio network can make services available to a mobile user.

STATE OF THE ART

Patent EP-B1-0 827 119 describes a method for loading a SIM card with a money amount value, wherein a pre-payable value card for a particular money amount can be purchased. On the value card, the card's owner uncovers a field that is masked with a non-transparent removable layer, thus making visible a code. The mobile user then calls a service number, whereby he is connected with a database in which all codes allocated to value cards and the money amount associated respectively to the code. The caller is invited to enter the uncovered code with the calling communication device. If the entered code is found in the database, a short message with the money amount value to be loaded is prepared. The money amount value and the code are marked as used or deleted in the database and the next time the SIM card is inserted in any communication device and a communication is established with the communication network, the SIM card to be loaded is loaded by means of the prepared short message with the money amount value stored in the meantime.

Although very successful, this method has several disadvantages. First, the manufacture of value cards with a covered coded is expensive. Furthermore, the manual introduction of the code with the mobile device is tedious and very error-prone. This is in particular the case if the code is long; the optimal code length is thus a compromise between the need for comfort and the need to leave enough codes unused for security reasons, so that mobile users barely have a possibility to guess correct codes through trial. It is also possible to enter practically only numeric, possibly alpha-numeric codes so that they can be entered with as little effort as possible on the limited keyboard of a mobile device. Numeric and alpha-numeric codes however use only a small part of possible combinations that could be possible with the corresponding number of bits in the codes. Since value cards remain sometimes a long time in stock or in the shops, the number of re-loadings possible with a set of value cards with a reasonable code length is limited. This method can thus in practice be used only for a specific service, namely for loading SIM cards.

This method further has the disadvantage that the codes are distributed by the operator of the mobile radio network and are thus dependent on the mobile radio network. Different value cards must thus be used for different networks. The programming of new services must thus be done anew for each network and used code system.

The security of this method is based mainly on hiding the codes to be entered. As soon as this code has been uncovered, it can simply be copied manually.

Other methods are known for ordering services by reading and transmitting a barcode with a barcode reader. Barcodes cannot however have any arbitrary length; longer barcodes namely require good, stable barcode readers that can hardly be built in portable devices. Furthermore, barcodes must be printed on the value cards in such a manner that they remain hidden until bought so that no third party can use them. Barcodes can for example easily be duplicated with a copying apparatus, which increases the possibilities of falsification.

Known methods for ordering services furthermore have the disadvantage that an order message with the order code always have to be sent to a predefined address (for example to a predefined telephone number). This number must either be known to the mobile user or be printed on the value card, which make more difficult the reading of the card. If the order is sent for example over SMS, the destination address also has to be entered. Services of different service providers must in general be ordered over different addresses. If the calling number or the electronic address of a service provider is modified, the corresponding services can no longer be ordered for most consumers and the value cards are then unusable.

REPRESENTATION OF THE INVENTION

It is an aim of the present invention to propose a new method for making available services to mobile users.

It is another aim of the present invention to propose a new method with which mobile users can order services with a code, whereas the code may have almost any length without the order method becoming unreasonable.

It is another aim of the invention to propose a new method for making available services to mobile users, wherein entered codes cannot (or only with difficulty) be copied manually.

It is another aim of the present invention to propose a new method with which it is possible for mobile users to order services from different provides over a common predetermined electronic address.

These aims are achieved in particular through a method with which services can be made available to mobile users with a mobile device, having the following method steps:

an electronic code stored in a RFID element is read with a RFID reading device, said electronic code is transmitted over a telecommunication network to a server, said server sends a query to a name service-server in which connections between several electronic codes and several electronic address are registered, said name service-server sends the electronic address of a page corresponding to said code to said server, said server accesses said page, the ordered service is for example made available to the mobile user.

This has the advantage that the code corresponding to the desired service does not have to be entered manually but is read from a RFIUD with a RFID reading device.

This also has the advantage that the desired service is prepared over an electronic page. This has the advantage that parameters and conditions of the service are defined on a page that can be edited at any time.

The address of the page corresponds to a code read in the RFID tag. The connection between the code and the electronic address of the page is not static but registered in a name service-server. This has the advantage that changes of the page address are possible at any time and easily traceable. This also has the advantage that it is a universal system in which services can be ordered from every mobile device in every network over a single address of the server.

This method gives a mobile user the proof that he owns a certain code "physically". The mere knowledge of the code is not sufficient; the code must be read from a tag with a RFID reader device. Since tags are difficult to copy, the security is higher than with printed numeric codes or barcodes, which are easier to duplicate.

BRIEF DESCRIPTION OF THE FIGURES

The present invention will be described hereinafter in more detail on the basis of the figures, which show:

FIG. 3 a block diagram of an inventive system wherein a server, a service-server, a page server and a name server are provided.

FIG. 4 a block diagram of an inventive system, wherein a server, a service-server and a name server are provided.

WAYS OF EXECUTING THE INVENTION

Figure 1:
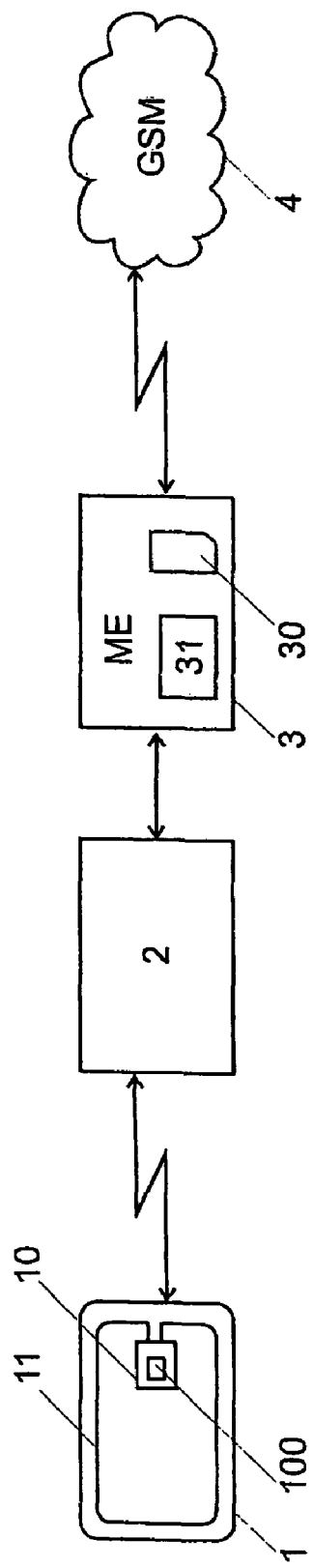
FIG. 1 a block diagram of a system with a mobile device, a RFID reader device and a RFID.

FIG. 1 shows the system used by the user or mobile user for ordering services with the inventive method. A mobile device 3 (for example a mobile radio telephone or a PDA with an interface for a cellular mobile radio network) can receive from a mobile radio network 4 and send to this network short messages (for example SMS and USSD) and data (for example IP packets). This mobile radio network 4 is for example a GSM, GPRS, HSCSD, EDGE, UMTS or CDMA network over which data can also be transmitted. The mobile device 3 contains an identification module (for example a SIM card 30) in order to identify the device through the network 4. One or several software applications 31 can be executed by a processor in the mobile device 3.

The mobile device 3 further comprises a RFID reader device 2 or is connected with such a reader device (for example over a USB, Firewire, PCCard, Compactflash, proprietary or other connection or over a Bluetooth or WLAN contactless connection). The reader device 2 includes a micro-controller and at least one antenna or coil for contactlessly exchanging data with RFID components in the immediate vicinity. The data transmission occurs preferably in the frequency range of 13.56 Mhz, 900 Mhz and/or 860-930 Mhz. The reader part can preferably be chosen to work in different frequency ranges and with different RFIDs. The operational range for reading the RFID is preferably between 2 and 10 meters—depending on the orientation of the reader part and of the tag. The connection preferably occurs in half-duplex mode with an ASK backscatter modulation.

The tag 11 as value card 1 includes a chip 10 with a non-erasable permanent memory area in which a code 100 is stored during manufacture or during personalization of the tag. The code 100 identifies univocally each particular tag 11; each tag 11 preferably has another code. The code preferably cannot be falsified. The code producer (for example a network operator) keeps a table in which the valid, used or expired codes are marked as such.

Figure 2:
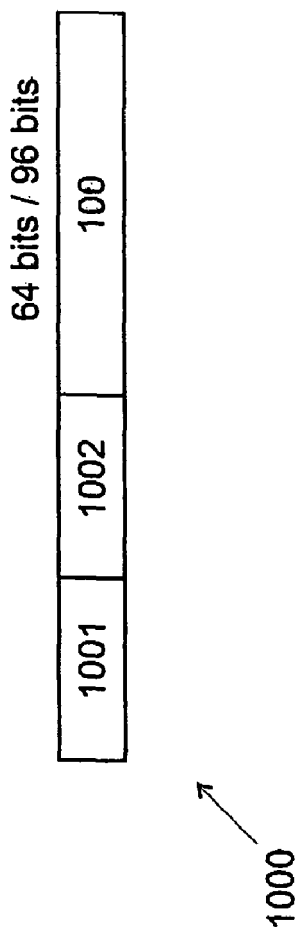
FIG. 2 the structure of a message with a code according to the invention.

The codes 100 preferably include 64, 96 or more bits and are organized hierarchically. The answer 1000 of the tag 11 to a query of the reader device 2 preferably includes a header 1001, redundant verification data 1002 and only then the code 100 (FIG. 2). Other data can be stored in the memory area of the chip 10 and be read by the reader part.

Codes 100 are preferably distributed by a common authority to different product manufacturers, mobile radio network providers and value added service providers; part of the code 100 preferably indicates the identity of the provider of the service purchased with the value card 1 (for example the identity of the mobile radio network operator). A service provider offering services to mobile users by means of value cards 1 reserves a series of codes 100 from the common authority and stores part of these codes 100 in value cards 1 that are then sold. As previously mentioned, a list of valid and used codes 100 is managed by the service provider; the corresponding amount of the value card can also be recorded on this list according to use. In another embodiment, this amount can be determined univocally from the code 100.

At least one application 31 is provided in the mobile device 3 for reading codes 100 in neighboring tags 11 over the reader device 2 and for sending this code 100 over the mobile radio network 4. Reading a code 100 is preferably initiated by the mobile device 3; it is possible for example that the mobile device 3 continuously or periodically searches for neighboring tags 11 and reads, processes or forwards codes 100 in found tags 11. In another, low-current embodiment, reading is initiated by the user of the mobile device 3 who launches a corresponding application 31 or enters a command if he wishes to read a tag 11. Reading the tag 11 with the mobile device 3 or with another device can also be initiated by an external device (for example a selling point or an automatic machine) over an interface at close range (for example Bluetooth or WLAN) over the mobile radio network 4 or over a link on a visited WEB or WAP page.

Simple filters and processing means can be provided as part of the application 31 in the mobile device 3 and/or in the reader device 2, in order to process read codes 100. The application can for example process and forward only certain parts of the codes 100. Redundancy checks can also be provided to delete codes 100 that are not plausible or that contain errors. Previously used codes 100 are preferably stored in a database in the mobile device 3 for the purpose of future controls, statistic evaluations and backups.

According to the application, a password or another authentication can also be requested before the code 100 is read or forwarded. The password can for example be printed on a hidden part of the value card that can be uncovered or is communicated to the mobile user over another channel. The password verification can for example prevent an unauthorized third party from reading and using codes in someone else's value cards with a suitable reader device.

In one embodiment, the password consists of part of the code 100 or can be determined from this code with a function. The password can for example result from a signature of the code that can be verified with a public key. In this case, the password can be determined from the code only if the unauthorized third party knows the corresponding function or the private signing key. This embodiment has the advantage that the application 31 can verify the validity of the password merely on the basis of the code.

In another embodiment, the validity of the password is verified on the basis of a table in the SIM card 30, in the mobile device 3 or in the external server.

In yet another embodiment, the password is stored in the tag 11 and verified by the tag 11. This embodiment requires however expensive tags that can also store, receive and compare passwords.

The application 31 can request a confirmation of the mobile user before the code 100 is processed any further and the desired service is ordered. This confirmation can for example be entered over the keyboard of the mobile device, PDA, over other input means or with a voice command.

If the password is correct and the confirmation is received, the read code 100 is packaged in a service order message (for example in a short message or preferably in a GPRS or UMTS packet) and sent over the mobile radio network 4 to a server 5 at a known address, preferably a server within the infrastructure of the mobile radio network 4 (FIG. 3). The service order message is optionally signed and/or provided with a time stamp by the mobile device 3 or by the SIM card 30.

The server 5 administers service order messages with codes that are received from several or possibly all RFID readers 2. Other, more complex filters can be provided in the server 5 in order to handle codes from different areas differently or not at all.

A password can also be required by the server 5 for the code to be processed at all; like in the mobile device 3, this password can bee derived from the code 100 itself or be verified on the basis of a table. The password is for example transmitted to the server 5 in a message together with the code 100.

The server 5 can also verify the identity of the mobile user. This is all the more reliable if the server 5 is administered by the operator of the mobile radio network 4. In this case, the identity of the mobile user can be determined reliably for example on the basis of the IMSI (International Mobile Subscriber Identity) or of another identity in the SIM card 30. Certain services are supplied only to certain mobile users (for example mobile users having a corresponding subscription, having a sufficient balance on a money account, or whose profile allows the supplying of the service).

If the password is wrong or if the desired service cannot be made available for any other reason, a message is preferably sent to the mobile user (for example over SMS, USSD or Internet). After several failed attempts, further attempts can be blocked definitively or temporarily for security reasons. In this manner, it is possible to prevent that valid codes can be guessed through repeated attempts.

The server 5 is connected over Internet or an intranet with a name service-server 6 in which for each code a corresponding electronic address of an electronic page is stored.

A query 50 with the code 100 just received is directed by the server 5 to the name service-server 6, which answers with the corresponding electronic address (answer 60). The electronic address consists for example of an URL or another address for a TCP-IP network.

The name service-server 6 can be administered by the operator of the server 5 and/or by external entities (for example by the organization distributing the codes 100 to the different companies). Several name service-servers can be connected with one another so that the desired address is sought in another name service-server if it is not found in the server 6. This allows for example a mobile radio network operator to process also codes from other organizations. A local cache of an external name service can also be provided in the server 5 or in the domain of the server 5; this cache can for example contain only the addresses corresponding to the codes 100 that are located in the value cards 1 of the mobile radio network operator.

The user of the mobile device 3 can thus always send all codes 100 of all service providers to the same target server 5 that determines from the name service-server 6 or from the network of name service-servers 6 the address of the page on the basis of which the desired service is made available. Processing the service order message thus depends only on the code in the message. Similar messages that reach different servers 5 of several service providers can thus cause the same service to be made available.

The connection in the name service-server 6 between a code 100 and an address can preferably be modified anytime by the provider of the desired service (for example over a dedicated WEB form). This allows the electronic address of a page or of a domain to change without having to inform the end users.

The address of the desired page can thus be found only and univocally on the basis of the 64 or 96 bits codes stored in the tag 11; the page that is accessed is thus completely independent from the address or telephone number of the server 5. Since many products and value cards must be marked, and since for security reasons not all codes can be used, enough freely available bits must be provided for the codes; simple IP numbers for example would possibly not suffice since very many possible combinations have already been allocated. Another, independent page addressing system is preferably used.

The server 5 receives the answer 60 from the name service-server 6 with the desired page address and access the corresponding page in the server 7 or a network with several local or remote servers (query 51 and answer 70 in FIG. 3).

In one embodiment, the address of the desired page results from a combination of the address indicated by the name service-server 6 with one or several bits of the code 100. In this case, the address in the name service-server 6 corresponds to an area in which the individual pages correspond to certain parts of the code. This has the advantage that the name service-server 6 can be designed more easily.

The page in the server 7 accessed by the server 5 possibly includes a hypertext content in a markup language. In one embodiment, this page comprises an XML (extended Markup Language) content. In another embodiment, the page includes a PML (Product Marking Language) content. The page can also support SOAP protocol (Simple Object Access Protocol), .NET Framework or other web services with which the server 5 and finally the mobile device 3 can access services and objects of the server 7. In this case, the inventive method includes making available executable program code elements or SOAP and/or .NET services.

The server 5 downloads the desired page from the server 7 and/or accesses the desired service (or the object at the indicated address) in order to make the desired service available. In the embodiment of FIG. 3, this service is made available over a services server 8 to which the parameters gained from the server 7 are directed, and possibly parameters of the mobile radio network are transmitted.

In one embodiment, the services server 8 consists of a prepaid server in the infrastructure of the mobile radio network 4. The value card 1 in this case is purchased for an amount that is loaded into the prepaid money account of the mobile user in the server 8 and/or in his SIM card 30. This money account is debited when the mobile user establishes voice or data connections over the mobile radio network 4 or in a contactless local network (for example WLAN). The service can also include the modification of other mobile user specific parameters in the mobile radio network.

In another embodiment, information (for example WEB or WAP pages), text, photo, music or video documents, software programs, executable program code elements etc.) are downloaded from the page 7 or from the services server into the mobile device 3. In this manner, it is possible with the value card 1 to purchase contents.

In yet another embodiment, an electronic key is sent to the mobile device 3 and/or to the SIM card 30 and stored. The tag 1 serves in this case as personal owner identification; it can be exchanged with the inventive method against an electronic key that can be used by the mobile device 3 for accessing secured locations or devices. This key can for example be used in a local network for proving the identity of the user of the mobile device 3.

In yet another embodiment, the method includes making available (for example transmitting) configuration parameters of an apparatus to the mobile device 3. In this manner, for example, the mobile device 3 or another apparatus connected with the mobile device 3 can be re-programmed or re-configured.

After the ordered service has been made available, a corresponding modification is recorded in the server 5 and/or in the services server 8, so that the same tag 11 cannot be used several times. In one embodiment, the page of the server 7 is modified accordingly by recording for example the supplying of the service. The used code is also preferably marked as used in the name service-server 6 and/or in the server 5.

The desired service can depend on parameters determined within the mobile radio network 4, including the identity of the user of the mobile device 3, his type of contract, his location, the time, the visited network, his solvency and his profile etc. At least some of these parameters are possibly checked in the server before at all supplying the desired service. One can thus for example verify whether a certain value card 1 with an expiration date is still valid, whether the desired service is compatible with the type of contract of the mobile user and/or with the type of the used mobile device, etc. The language of the determined content can depend on the mobile user's location and/or on his profile.

The desired service can be supplied over a reverse channel (for example over SMS, USSD, WAP or other IP packets) to the mobile device 3 and/or to the SIM card 30. Certain services, including product orders and many money transactions, require no transmission of data to the mobile device 3. However, at least a confirmation is preferably sent to the mobile device 3, it being possible to transmit the confirmation over another channel as the service. It is for example possible that the service includes the transmission of data to the mobile device 3 over a fast data channel whilst the order is confirmed with a short text message or even over the voice channel.

The confirmation sent by the server 5 can preferably include at least part of the contents of the page that was accessed and/or a link to this page.

FIG. 4 shows another embodiment in which the desired page corresponding to the address of the sent code is stored in the services server 8.

Figure 5:
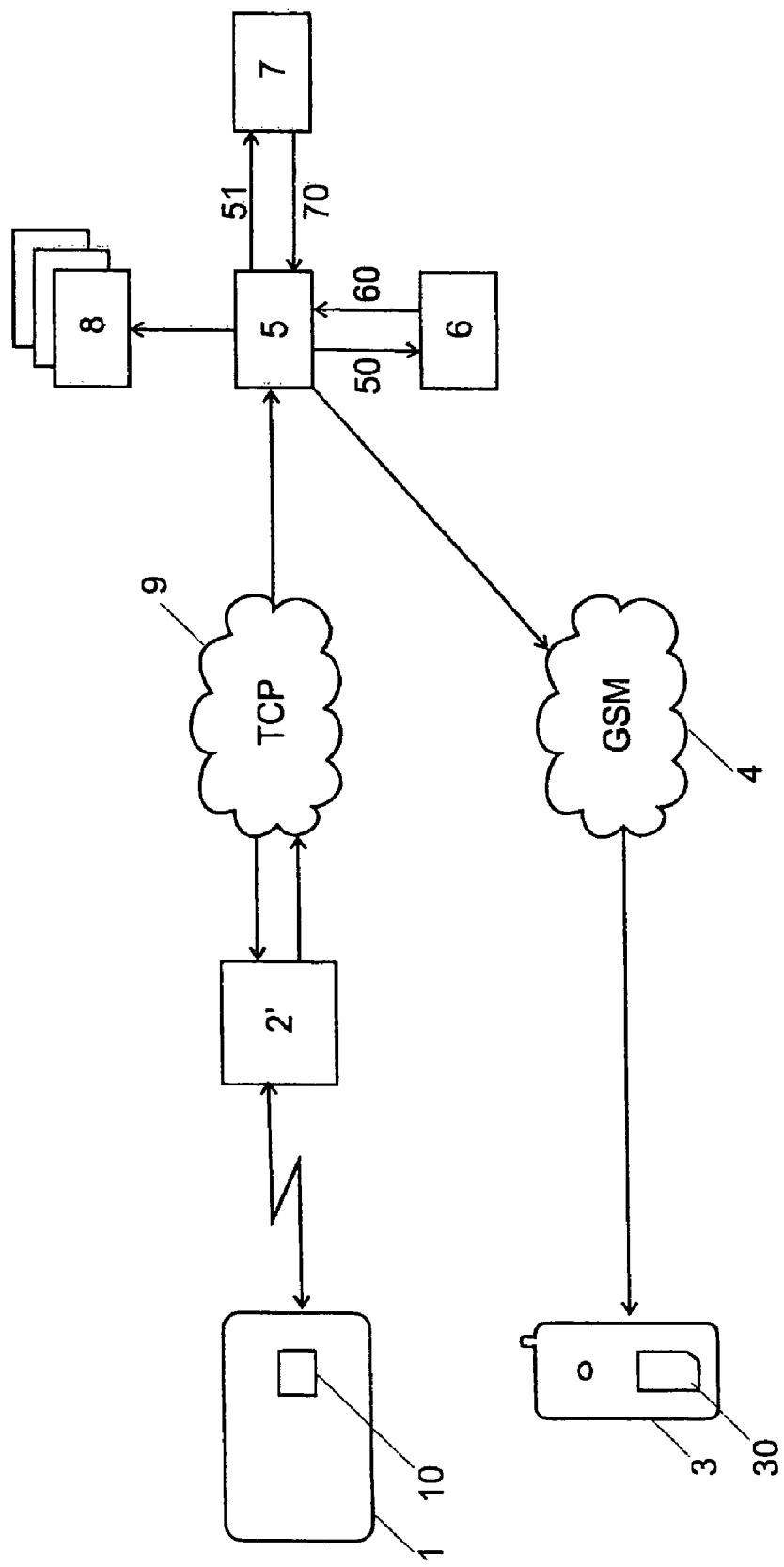
FIG. 5 a block diagram of an inventive system wherein the desired service is ordered over a separate terminal.

FIG. 5 shows an embodiment in which the RFID reader device with which the tag 11 is read is not connected with the mobile device 3. In this case, the code 100 is read by an external RFID reader device 2' (for example a reader device 2' connected with a sales machine, not represented, a shop till, a computer or a second mobile device). The code 100 is then sent over a telecommunication network 9 (for example over a VPN through Internet) to the server 5 which retrieves the corresponding page address from the name service-server 6, accesses this page in the page server 7 and makes available the desired service on the basis of the services server 8 to the mobile user. The supplying of the service can include the transmission of data, contents or programs to the mobile device 3 over the mobile radio network 4.

This invention thus allows RFIDs with codes as electronic tokens to be used for services that are made available by means of electronic pages, wherein the content of the page and its address can be modified after the tag has been distributed.

REFERENCE LIST

1 Value card
10 Chip
11 Tag
100 Code
1000 Answer
1001 Header
1002 Verification data
2 RFID reader device
2' RFID reader device
3 Mobile device
30 SIM card
31 Application
4 Mobile radio network
5 Server
50 Query
51 Query
6 Name service-server
60 Answer
7 Server
8 Services server
9 Telecommunication network

The invention claimed is:

1. Method with which services can be made available to mobile users with a mobile device comprising or attached to an Radio Frequency Identification (RFID) reading device, having the following method steps:
   an electronic code stored in a RFID element is read with the RFID reading device,
   said electronic code is transmitted by said mobile device over a telecommunication network to a server,
   said server sends a query to a name service-server in which connections between several electronic codes each associated with one or more corresponding services and several electronic addresses are registered,
   said name service-server sends the electronic address of a page corresponding to said code to said server, wherein said page contains parameters or conditions or both for the service associated with said electronic code read by the RFID reading device,
   said server accesses said page,
   the service associated with said electronic code is made available to the user by a services server.

2. The method of claim 1, wherein said server is located in the infrastructure of the telecommunication network, and wherein said name service-server is located outside the infrastructure of the telecommunication network and is accessible to several network operators.

3. The method of claim 1, wherein said page includes a hypertext content in a markup language.

4. The method of claim 1, wherein said RFID element is purchased by a mobile user, and wherein said electronic code is marked as used in a server as soon as said service has been supplied.

5. The method of claim 1, wherein said service includes a voucher for access by the mobile user to said telecommunication network.

6. The method of claim 1, wherein said service includes the supplying of configuration parameters of an apparatus.

7. The method of claim 1, wherein said service includes the modification of mobile user specific parameters in a mobile radio network as telecommunication network.

8. The method of claim 1, wherein said service includes the supplying of SOAP or .NET services or both accessible to said server.

9. The method of claim 1, wherein said service includes the supplying of executable program code elements.

10. The method of claim 1, wherein after the service has been supplied a confirmation is sent to the mobile device, and wherein said confirmation includes at least part of the content of said page or a link or both to one said page.

11. The method of claim 1, wherein said RFID reader device is part of a mobile radio telephone as mobile device, and wherein said code is packaged by a software application in said mobile radio telephone and transmitted to said server.

12. The method of claim 1, wherein said electronic codes are organized hierarchically, and wherein a part of the code indicates the identity of said mobile radio network operator.

13. The method of claim 1, wherein the mobile user enters a password, and wherein said service is only supplied if the password corresponds to said code.

14. The method of claim 1, wherein the identity of the mobile user is verified, and supplying the service depends on this identity.

15. The method of claim 1, wherein the identity of the mobile user is determined with a chip-card.

16. The method of claim 1, wherein said electronic address includes an address provided by the name-service server and at least a portion of the electronic code.

17. Method with which services can be made available to mobile users with a mobile device comprising or attached to an Radio Frequency Identification (RFID) reading device, having the following method steps:

registering by said mobile device a plurality of electronic codes, each associated with a corresponding service and a corresponding electronic address of a web page having parameters or conditions or both for the corresponding service, in a name server, reading an electronic code stored RFID element with the RFID reading device, wherein said read electronic code is one of said plurality of electronic codes registered in said name service-server, transmitting said read electronic code, using said mobile device, over a telecommunication network to a communication server, sending a query regarding said read electronic code, using said communication server, to the name service-server;

said name service-server sending the electronic address of the page corresponding to said read electronic code to said communication server, said communication server accessing said page, and the service corresponding to said electronic code is made available to the mobile device and/or a user.

18. The method of claim 17, wherein the ordered service is made available for purchase by the user of the mobile device.

* * * * *